United States Patent [19]
Edge

[11] Patent Number: 5,877,787
[45] Date of Patent: Mar. 2, 1999

[54] APPARATUS FOR RECALIBRATING A MULTI-COLOR IMAGING SYSTEM

[75] Inventor: Christopher J. Edge, St. Paul, Minn.

[73] Assignee: Minnesota Mining and Manufacturing Company, St. Paul, Minn.

[21] Appl. No.: 987,878

[22] Filed: Dec. 8, 1997

Related U.S. Application Data

[63] Continuation of Ser. No. 431,614, May 1, 1995, Pat. No. 5,781,206.

[51] Int. Cl.$^6$ .................................................. B42J 29/393
[52] U.S. Cl. ............................. 347/19; 347/115; 347/172
[58] Field of Search ............................ 347/19, 172, 188, 347/115; 395/109; 358/298, 501, 502, 504, 515, 518, 525, 519, 520, 523, 500; 399/72

[56] References Cited

U.S. PATENT DOCUMENTS

| | | | |
|---|---|---|---|
| 3,612,753 | 10/1971 | Korman | 358/534 |
| 4,500,919 | 2/1985 | Schreiber | 358/518 |
| 4,717,954 | 1/1988 | Fujita et al. | 358/523 |
| 4,721,951 | 1/1988 | Holler | 358/520 |
| 4,839,722 | 6/1989 | Barry et al. | 358/523 |
| 4,929,978 | 5/1990 | Kanamori et al. | 355/38 |
| 4,959,711 | 9/1990 | Hung et al. | 358/523 |
| 5,065,234 | 11/1991 | Hung et al. | 358/523 |
| 5,121,196 | 6/1992 | Hung | 358/504 |
| 5,258,810 | 11/1993 | Bresina et al. | 347/115 |
| 5,309,257 | 5/1994 | Bonino et al. | 358/504 |
| 5,313,291 | 5/1994 | Appel et al. | 358/501 |
| 5,333,069 | 7/1994 | Spence | 358/517 |
| 5,339,176 | 8/1994 | Smilansky et al. | 358/504 |
| 5,363,318 | 11/1994 | McCauley | 364/571.01 |

FOREIGN PATENT DOCUMENTS

| | | | |
|---|---|---|---|
| 0 144 188 | 6/1985 | European Pat. Off. | H04N 1/46 |
| 0 389 502 | 11/1990 | European Pat. Off. | H04N 1/46 |
| 0 556 133 A2 | 8/1993 | European Pat. Off. | G03F 3/10 |
| 23 28 874 | 1/1975 | Germany | G03F 3/00 |
| 2136848 | 5/1990 | Japan | G03B 27/73 |

OTHER PUBLICATIONS

Berns, Roy S., "Spectral Modeling of a Dye Diffusion Thermal Transfer Printer", *Journal of Electronic Imaging*, vol. 2(4), Oct. 1993, pp. 359–370.

Field, Gary G., "Color Scanning and Imaging Systems", Pittsburgh Graphic Arts Technical Foundation, 1990, pp. 41–58.

Hoshino, Toru and Berns, Roy S., "Color Gamut Mapping Techniques for Color Hard Copy Images", *SPIE*, vol. 1909, Jun. 1993, pp. 152–165.

Kohler, Timothy and Berns, Roy S., "Reducing Metamerism and Increasing Gamut Using Five or More Colored Inks", Munsell Color Science Laboratory, Rochester, New York.

(List continued on next page.)

*Primary Examiner*—N. Le
*Assistant Examiner*—L. Anderson
*Attorney, Agent, or Firm*—William D. Bauer

[57] ABSTRACT

An apparatus and method for recalibrating a multi-color imaging system are provided. The multi-color imaging system is capable of applying different colorants to a substrate based on a plurality of input color values. The input color values control amounts of the colorants to be applied to the substrate by the imaging system. A subset of the input color values is selected and used to control the imaging system to apply one or more of the different colorants to the substrate, thereby forming a plurality of different color patches on the substrate. The subset of input color values is selected such that one or more of the different color patches is formed by application of a combination of at least two of the different colorants to the substrate. Color values are measured for each of the different color patches, and compared to reference color values, representing a calibrated condition of the imaging system. An error value is calculated. The error value represents a deviation of the measured color values from the reference color values. The input color values for each colorant then are independently adjusted to reduce the error value to a predetermined degree.

27 Claims, 5 Drawing Sheets

OTHER PUBLICATIONS

Lindbloom, Bruce J., "Accurate Color Reproduction for Computer Graphics Applications", *Computer Graphics*, vol. 23, No. 3, Jul. 1989, pp. 117–126.

Rhodes, Warren L., "Proposal for an Empirical Approach to Color Reproduction", *COLOR Research and Application*, vol. 3, No. 4, Winter 1978, pp. 197–201.

Spooner, David L., "Measurement of the Transfer Function of Hardcopy Color Reproduction Systems: A Metric for Comparison", Proceedings 1992, vol. 2, Technical Association of the Graphic Arts and Inter–Society Color Council, papers presented at the Conference on Comparison of Color Images Presented in Different Media, Williamsburg, Virginia, Feb. 23–26, 1992, pp. 917–927.

SCITEX Corporation, Ltd., "Trans/4 User Guide, Appendix E", Dec. 1990, pp. 1491–1558.

Apple Computer, Inc., "ColorSync 2.0 Proposal", Version 1.0, Jul. 23, 1993, pp. 1–40.

APPARATUS FOR RECALIBRATING A MULTI-COLOR IMAGING SYSTEM

This is a continuation of application Ser. No. 08/431,614, filed May 1, 1995, now U.S. Pat. No. 5,781,206.

FIELD OF THE INVENTION

The present invention relates generally to multi-color imaging technology and, more particularly, to techniques for recalibrating a multi-color imaging system.

DISCUSSION OF RELATED ART

A multi-color imaging system typically is configured to form a reproduction of a multi-color image by application of a plurality of different colorants to a substrate. The multi-color image is defined by a set of color separations containing color values. Each color value represents an intensity for one of the separated colors at a particular pixel in the original image. Thus, each pixel is defined by a set of color values, each representing the intensity of a different separated color in the pixel.

The imaging system uses the separated color values to control the amount of each colorant applied to each pixel on the substrate. In an inkjet printing system, for example, the color values are used to control the amount of ink deposited on a sheet of paper. In a thermal dye transfer printing system, the color values may be used to control a thermal head or laser to effect the transfer of an amount of dye from a donor to a receptor. In either case, the imaging system applies to the substrate a combination of different colorants, such as cyan, magenta, yellow, and black (CMYK) inks or dyes, to reproduce the color of a pixel in the original image.

The human eye integrates the individual pixels to form an overall perception of the original image. The accuracy of the reproduction of the original image is a function of the color response of the imaging system. The term "color response" refers to a mathematical correlation between the input color values used to control the imaging system and the output color values obtained by measuring the actual colors formed by the imaging system on the substrate. The color response ordinarily must be calibrated to conform to a reference color response. The reference color response may be based on a target imaging system. For example, the imaging system to be calibrated may be a proofing system designed to provide an approximation of an image to be formed on a target printing system.

The calibration procedure typically involves the application of various combinations of the different colorants to the imaging substrate to form a large number of different color patches. The color patches represent colors distributed throughout the color space of the imaging system. The color patches are measured with a spectrophotometer, calorimeter, or other measuring device, to obtain color values representing the color response of the imaging system. The measured color values may take the form of component color values, e.g., C, M, Y, K, for each colorant present in the measured color patch. Alternatively, the measured color values may take the form of composite color space vectors representing the color space coordinates of the measured color patch in a system-independent coordinate system such as CIE XYZ or L*, a*, b*. The color patches are produced on a target imaging system. The calibration procedure involves mapping the colorant values of the proofing system to produce the same measured color values for the color patches as produced by the target imaging system.

The measured color values are mapped to reference color values representing the color response of the target imaging system after calibration is accomplished. Over time, the imaging system can become uncalibrated due to a variety of hardware and material variations. The variations cause the color response of the imaging system to vary from the color response of the target imaging system. If the deviation is not eliminated, the imaging system will not accurately represent the output of the target imaging system. To eliminate the deviation, thereby recalibrating the imaging system, the input color values must be manipulated.

One method of manipulation is one-dimensional linearization. The term "linearization" refers to one-dimensional correction of the input color values to return the one-dimensional range of the imaging system to its calibrated functional dependence on the one-dimensional domain. This one-dimensional correction ordinarily is accomplished by the application of one-dimensional look-up tables, or "1D LUT's," to the input color values for each separated color. Linearization of a film recorder can be an adequate technique for obtaining consistent color response from conventional halftone color proofing systems. Conventional halftone color proofing systems, such as the 3M Matchprint™ color proofing system, available from Minnesota Mining & Manufacturing Company, of St. Paul, Minn., usually are stable over time and, moreover, are negatively acting. A negatively acting proofing system reproduces an image by removing halftone spots from a substrate, typically by laser exposure and chemical removal, leaving the image portions behind. This approach generally provides a repeatable way of making hard copy color proofs, assuming that the halftone media exhibits a linear response and the output of the proofing system is consistent. Therefore, linearization may be sufficient to return such an imaging system to its calibrated condition.

In contrast, most digital color proofing systems are either continuous tone systems, such as the 3M Rainbow™ digital color proofing system, available from Minnesota Mining & Manufacturing Company, of St. Paul, Minn., or halftone systems with variable maximum densities, such as the Kodak Approval™ digital color proofing system, available from Eastman Kodak Corporation, of Rochester, N.Y. Digital proofing systems can be more susceptible to variation than conventional halftone proofing systems. The various colorants may interact by admixture during the imaging process, for example, significantly altering the color response for secondary and tertiary colors. If the digital proofing system is dye-based, slight changes in the spectral properties of the dyes also tend to be more likely, relative to pigment-based systems, resulting in variations in the color response. Further, variations in the colorant reception characteristics of the substrate can alter the color response.

The larger number of hardware and materials variations arising in direct digital color proofing systems, relative to conventional halftone systems, creates a greater possibility of drift and systematic shift that can affect the color response. Unfortunately, such variations may not be well-corrected by simple one-dimensional linearization of the separated color values in each independent color channel. The colors critical to perception of the image by the human eye tend to lie in regions of color space having more than one color channel that is non-zero in value. One-dimensional linearization of the single color channels independently from one another does not adequately address correction of the color response for admixed colors created by interaction of two or more colorants.

The use of color transformations further complicates the recalibration process. Color transformations are becoming standard techniques in the area of color management. For example, a digital color proofing system will produce a different color gamut and color response than a conventional color proofing system. In order to obtain a good visual match between the output of the digital color proofing system and the output of the conventional color proofing system when proofing the same image file, a complex color transformation typically is required. For CMYK systems, for example, the color transformation is of the form CMYK→C'M'Y'K'. The color transformation is performed on a pixel-by-pixel basis via a LUT or an algorithm. Examples of color transformation techniques are disclosed in U.S. Pat. No. 5,339,176 to Smilansky et al. and U.S. Pat. No. 4,500,919 to Schreiber.

Color transformations can be used to achieve reliable color reproduction. As discussed above, however, the use of color transformations complicates the problem of recalibration of the digital color proofing system. Specifically, the primary colorants C, M, Y, K may each have significant admixtures of other colorants in order to achieve the correct hue. In addition, saturated reds, greens, and blues may have much less than the maximum amount of C, M, Y, or K in order to achieve good color. With color transformation, the individual C, M, Y, and K colorants can no longer be sampled independently of one another. Thus, single-channel linearization is made difficult. Further, standard linearization does not consider second-order effects, such as spatial shifts and interaction between channels.

An alternative recalibration approach considers neutral grays generated after CMYK transformation. This method, implemented by both the above-mentioned 3M Rainbow™ digital color proofing system and the Tektronix Phaser™ 480 color printer, available from Tektronix Incorporated, of Beaverton, Oreg., relies on visual comparison of neutral gray hard copy reference samples and off-gray color patches formed by the system. The off-gray color patches are labeled according to their deviation from gray, i.e., +2% cyan, –1% yellow, etc. By visually comparing the reference gray samples to the various off-gray patches, one can determine whether better gray balance is achieved by adding more or less of particular colorants. In order to have an adequate sampling of the different permutations, however, a large number of off-gray patches are required for each gray level, i.e., highlight, quarter tone, midtone, etc.

The visual comparison technique described above works well as a visually based recalibration tool, but is impractical for use as a measurement-based tool. The large number of patches that would have to be measured for a software-based application to determine the optimal corrections required to gray balance the highlight, quarter-tone, mid-tone, and three-quarter tone grays would be extremely time consuming. If saturated chromatic colors, such as reds, greens, and blues were included for reliable accuracy, and multiple samples were measured across the substrate to account for systematic variability, the number of measurements could easily enter into the thousands. Reliable accuracy generally means that any CMYK tint produced by the system will produce substantially the same L*a*b* value as the corresponding CMYK tint produced by the printing or proofing process being simulated, within the noise limitations of both systems.

If the color proofing system without color transformation behaves like a nearly perfect halftone system in its native mode, and if the overlap behavior of the halftone screening process can be approximated as being stochastic, the mathematical calculations to correct for gray balance are fairly simple via the Neugebauer equations. Digital color proofing systems typically are not perfect halftone systems, however, and therefore are less amenable to the use of a measurement-based recalibration tool that directly optimizes the grays and other mixed colors. Moreover, the digital color proofing system may exhibit significant differences in gamut relative to the target proofing system, and therefore requires color transformations, as described above. It is difficult to mathematically calculate the effect on grays and chromatic colors due to alteration of the relative CMYK values, particularly when color transformations are being employed. Hence, visually comparing a large number of three-color gray patches or measuring C, M, Y, and K patches separately are the two primary methods currently employed for recalibration.

SUMMARY OF THE INVENTION

The present invention, as broadly embodied and claimed herein, is directed to an apparatus and method for recalibrating a multi-color imaging system.

The multi-color imaging system, in accordance with the present invention, is capable of applying a plurality of different colorants to a substrate based on a plurality of input color values, wherein the input color values control amounts of the colorants to be applied to the substrate by the imaging system.

In accordance with the present invention, the apparatus and method (a) select a subset of the plurality of input color values, (b) control the imaging system to apply one or more of the different colorants to the substrate based on the subset of the plurality of input color values, thereby forming a plurality of different color patches on the substrate, wherein the subset of the plurality of input color values is selected in the step (a) such that one or more of the different color patches is formed by application of a combination of at least two of the different colorants to the substrate, (c) measure a plurality of color values for each of the different color patches formed on the substrate, (d) compare each of the measured color values to a corresponding one of a plurality of reference color values, the reference color values representing a calibrated condition of the imaging system, (e) calculate an error value representing a deviation of the measured color values from the reference color values, and (f) adjust one or more of the plurality of input color values to reduce the error value to a predetermined degree, wherein the adjustment of the input color values for one of the colorants is performed independently of the adjustment of the input color values for others of the colorants.

The advantages of the apparatus and method of the present invention will be set forth in part in the description that follows, and in part will be apparent from the description, or may be learned by practice of the present invention. The advantages of the present invention will be realized and attained by means particularly pointed out in the written description and claims hereof, as well as in the appended drawings. It is to be understood, however, that both the foregoing general description and the following detailed description are exemplary and explanatory only, and not restrictive of the present invention, as claimed.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to explain the principles of the invention.

DETAILED DESCRIPTION OF THE PREFERRED EMBODIMENTS

Figure 1:
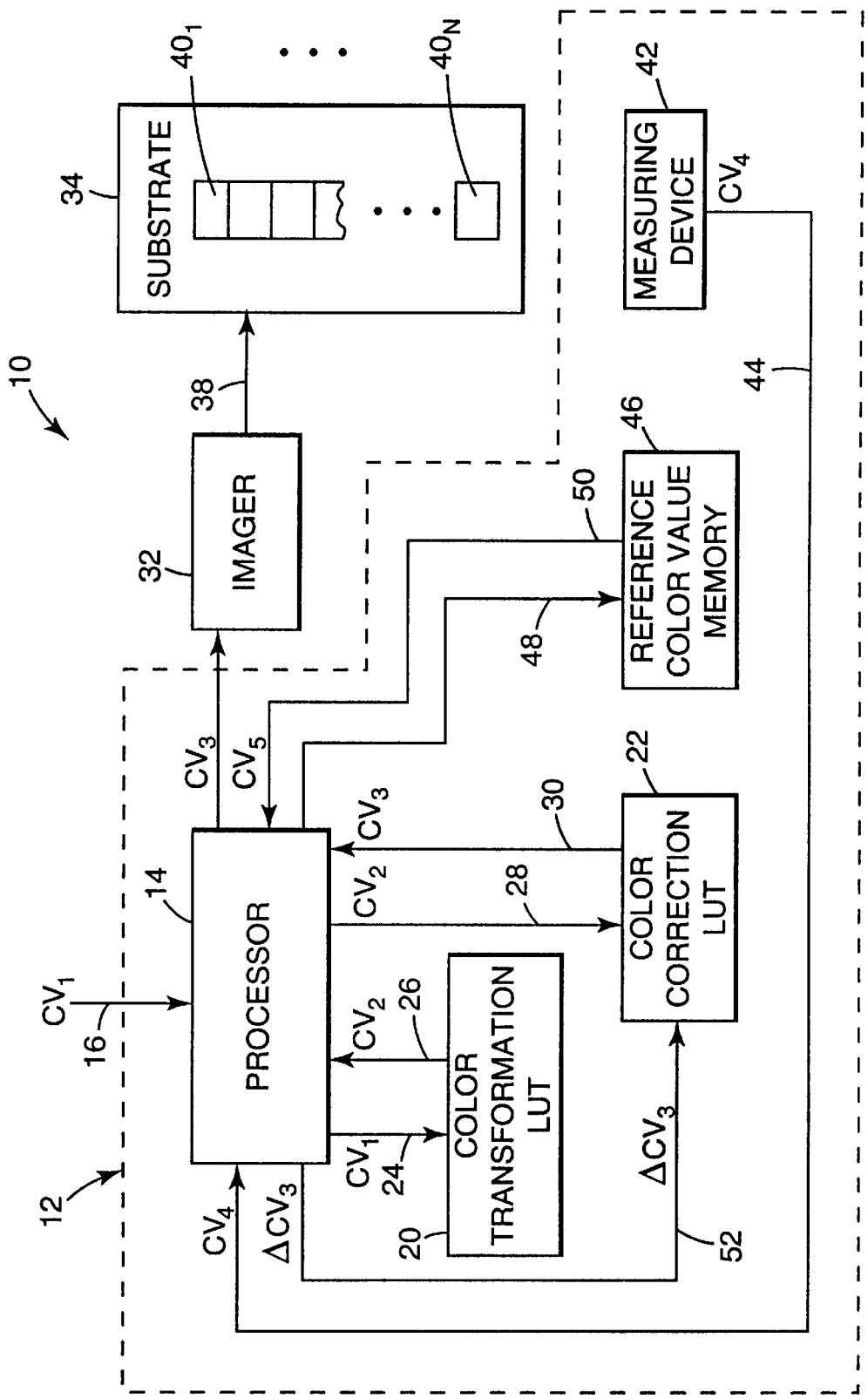
FIG. 1 is a functional block diagram of multi-color imaging system incorporating an apparatus and method for recalibrating the imaging system, in accordance with the present invention.

FIG. 1 is a functional block diagram of a multi-color imaging system 10 incorporating an apparatus 12 and method for recalibrating the imaging system, in accordance with the present invention. The recalibration apparatus 12 implements the steps of the recalibration method of the present invention. Accordingly, the functionality of both recalibration apparatus 12 and the recalibration method of the present invention will be described together in this description.

The recalibration apparatus 12 preferably includes a processor 14, as shown in FIG. 1, that executes a software application program implementing the recalibration method of the present invention. The processor 14 shown in FIG. 1 can be realized by a host computer system configured to execute the application program implementing the recalibration method. The host computer system may be, for example, an Apple Macintosh™ computer or an IBM PC. The application program may be embedded in a color management software package, such as that provided with the 3M Rainbow™ color proofing system, available from Minnesota Mining & Manufacturing Company, of St. Paul, Minn. Alternatively, processor 14 could be realized by a microprocessor, residing on an integrated circuit chip, that accesses a read-only memory (ROM) into which the application program is loaded. The implementation of the recalibration method via software affords flexibility in development and modification. The recalibration method alternatively can be implemented by an integrated logic-circuit, however, for increased color processing speed.

As shown in FIG. 1, in operation, processor 14 receives a plurality of input color values $CV_1$, as indicated by line 16. The input color values $CV_1$ constitute a color image file containing a plurality of color separations that together define a multi-color image. Each input color value $CV_1$ represents an intensity for one of the separated colors at a particular pixel in the original image. Thus, each pixel is defined by a set of input color values $CV_1$, each representing the intensity of a different separated color in the pixel. The imaging system 10 uses the separated input color values $CV_1$ to control the amount of each of a plurality of different colorants applied to a plurality of pixels on a substrate.

Specifically, processor 14 prepares input color values $CV_1$ for application to a printing mechanism by accessing a lookup table (LUT) memory. The LUT memory contains both a color transformation LUT 20 and a color correction LUT 22. The processor 14 first applies input color values $CV_1$ to color transformation LUT 20, as indicated by line 24. The color transformation LUT 20 is a multi-dimensional LUT that maps each of input color values $CV_1$ to a corresponding input color value $CV_2$ according to a color transformation function. For a CMYK system, color transformation LUT 20 will comprise a four-dimensional lookup table. The color transformation function defines the conversion of input color values $CV_1$ to input color values $CV_2$ necessary for color imaging system 10 to substantially simulate the color response of a particular target color proofing system. The color transformation function implemented by color transformation LUT 20 returns the appropriate transformed input color values $CV_2$ in response to input color values $CV_1$, as indicated by line 26. To simulate the color response of several different target color proofing systems, the LUT memory may contain a plurality of different color transformation LUT's 20 that can be selectively accessed according to a system user command.

The color correction LUT 22 is effectively cascaded with color transformation LUT 20. In other words, processor 14 accesses color correction LUT 22, as indicated by line 28, after color transformation of input color values $CV_1$ to input color values $CV_2$ according to multi-dimensional color transformation LUT 20. The color correction LUT 22 comprises a set of one-dimensional LUT's, each of which maps input color values $CV_2$ for a particular separated color to corresponding input color values $CV_3$. The one-dimensional mapping defined by color correction LUT 22 conforms to a color correction function. The color correction function defines the conversion of input color values $CV_2$ to input color values $CV_3$ necessary for color imaging system 10 to maintain simulation of the color response of a particular target color proofing system. The color correction function implemented by color correction LUT 22 returns the appropriate color-corrected input color value $CV_3$ in response to each color-transformed input color value $CV_2$, as indicated by line 30. The color correction LUT 22 serves as a fine tuning device, adjusting color values $CV_2$ when color imaging system 10 deviates from the color transformation function. The color correction LUT 22 thereby can be used to calibrate or recalibrate imaging system 10 to produce an output in substantial conformance with the color response of the target proofing system.

As shown in FIG. 1, in addition to recalibration apparatus 12, imaging system 10 includes an imager 32. The imager 32 may comprise a continuous tone printing mechanism capable of applying a plurality of different colorants to a substrate 34. After accessing color transformation LUT 20 and color correction LUT 22, processor 14 transmits input color values $CV_3$ to printing mechanism 32, as indicated by line 36, to drive the application of different colorants to substrate 34. Each of input color values $CV_3$ controls an amount of one of the colorants to be applied to a particular pixel on substrate 34 by printing mechanism 32, as indicated by line 38. The printing mechanism 32 may be realized by a variety of printing mechanisms including, for example, inkjet printers, thermal dye transfer printers, or laser-induced thermal dye transfer printing mechanisms. For an inkjet printing mechanism, the colorants may include cyan, magenta, yellow, and black (CMYK) inks deposited on substrate 34, which can be an ink receptor such as a sheet of paper. For a dye-based printing mechanism, the colorants may comprise CMYK dyes transferred from a dye donor to substrate 34, which can be a dye receptor.

The operation of the recalibration apparatus 12 and method of the present invention will now be described with reference to FIG. 1. To carry out the recalibration process, processor 14 selects a subset of a plurality of input color values $CV_1$. The subset is not selected from a particular image file, but from the range of intensity values 0–100% available for each input color value $CV_1$. After indexing the subset of input color values $CV_1$ to a subset of corresponding input color values $CV_3$ via both multi-dimensional color transformation LUT 20 and the one-dimensional LUT's within color correction LUT 22, processor 14 controls printing mechanism 32 to apply one or more different colorants to substrate 34, as indicated by line 38. The printing mechanism 32 thereby forms a plurality of different color patches $40_1$–$40_N$ on substrate 34.

After forming color patches $40_1$–$40_N$, processor 14 activates a measuring device 42. The measuring device 42 measures a plurality of output color values $CV_4$ for each of the different color patches $40_1$–$40_N$ formed on substrate 34. The measuring device 42 may comprise, for example, an external measuring system such as a Gretag™ SPM 50 color measurement device, commercially available from Gretag, Inc., of Regensdorf, Switzerland. A densitometer, such as an X-Rite color densitometer, commercially available from X-Rite, of Grandville, Mich., alternatively can be employed as measuring device 42. It is noted that realization of measuring device 42 by a densitometer may require a modified driver to be imbedded in the recalibration software to convert density CMY data or reflectance RGB data into a system independent color space such as XYZ or L*a*b*.

If configured as an automatic device, measuring device 42 may transmit the measured color values $CV_4$ directly to processor 14, as indicated by line 44. Alternatively, a human user may record and enter the measured color values $CV_4$ into processor 14 via a user interface. The processor 14 accesses a reference color value memory 46, as indicated by line 48, to obtain a set of reference color values $CV_5$, as indicated by line 50. The reference color values $CV_5$ represent the measured color values $CV_4$ that would be produced for each color patch in a calibrated condition of imaging system 10. In the calibrated condition, the color response of imaging system 10 substantially matches that of the target proofing system. The processor 14 compares each of the measured color values $CV_4$ received from measuring device 42 to a corresponding one of reference color values $CV_5$ obtained from reference color value memory 46. Based on the comparison, processor 14 determines a degree of deviation from the target color response.

For each of the measured color values $CV_4$, processor 14 calculates an error value. The error value represents the amount of deviation of measured color values $CV_4$ from reference color values $CV_5$. The error value may take the form of the root mean square (RMS) error determined from the individual error values between each measured color value $CV_4$ and the corresponding reference color value $CV_5$. The processor 14 uses the error value as the basis for adjustment of one or more of input color values $CV_3$ in color correction LUT 22 to thereby recalibrate imaging system 10 to a state sufficient to substantially produce the desired target color response. Specifically, processor 14 determines input color values $CV_3$ that reduce the error value to a predetermined, acceptable degree. The processor 14 determines the input color values using an error function that characterizes the difference between the color response function of imaging system 10, indicated by measured color values $CV_4$, and the target color response function, indicated by reference color values $CV_5$. Using the error function, processor 14 determines the input color values sufficient to reduce the error value by one-dimensional correction to the predetermined degree. As indicated by line 52, processor 14 then accesses color correction LUT 22 to adjust one or more of input color values $CV_3$ by amounts $\Delta CV_3$ sufficient to produce the reduced error value. It is noted that the calculated adjustments for one color transformation function also can be applied to a different color transformation function if both functions are based on the same original imaging system. However, further "fine tune" recalibration may be required by more stringent users to ensure adjustments are truly optimized for the different color transformation function. Calculation of the adjustments $\Delta CV_3$ to the input color values in color correction LUT 22 can be carried out according to standard error minimization techniques known to those skilled in the art. The method of least squares, for example, can be applied to determine the appropriate adjustments, as described in Prediction Analysis, Chapter 3, pages 27–73.

If desired, recalibration apparatus 12 may be configured to provide to a user of imaging system 10 a representation of the error value. Before recalibration, the error value represents deviation of the color response of imaging system 10 from the target color response. After recalibration, the error value provides an indication of the effectiveness of the recalibration procedure in driving the color response of imaging system 10 back to the target color response. Thus, the error value can be used as an evaluation of the recalibration procedure, or used as a method of confirmation that the correct color transformation function has been used, in the case in which the image is measured at a location remote from the imager.

Minimization of the error value reduces the amount of color response deviation between imaging system 10 and the target imaging system. The adjustment $\Delta CV_3$ to the input color values $CV_3$ for each of the colorants is performed independently of the adjustment of the input color values for the other colorants. In other words, the adjustment is a one-dimensional correction performed independently on each dimension of color correction LUT 22, and thus on each color channel of imaging system 10. As will be explained later in this description, however, the one-dimensional correction is not based only on consideration of single-colorant color patches, but on multi-colorant color patches deemed more critical for evaluation of color response.

The number of different color patches $40_1$–$40_N$ that must be formed and measured, in accordance with the recalibration apparatus and method of the present invention, is significantly less than required by existing calibration techniques. The reduced number of color patches $40_1$–$40_N$ and measurements provides a quick and efficient recalibration apparatus 12 with sufficient color response quality. The color response quality achieved by the recalibration apparatus 12 and method of the present invention eliminates the need for a complete calibration of imaging system 10. Rather, it is assumed that the color response imaging system 10 merely deviates a finite amount from the target color response. Thus, imaging system 10 can be quickly driven to the target color response by recalibration. Because the color response function of imaging system 10 is minimized, and not mapped, relative to the target color response, additional color patches representing additional color space coordinates can be added to the recalibration procedure for greater precision.

The reduced number of color patches $40_1$–$40_N$ and measurements is made possible by careful selection of the particular color patches formed. Specifically, color patches $40_1$–$40_N$ are selected to sample a small set of color space coordinates found to provide a good indication of overall conformance of imaging system 10 to the target color response. The recalibration apparatus 12 and method of the present invention sample the same color space coordinates for all target imaging systems that are being simulated by imaging system 10. Although the input color values $CV_1$ used to form color patches $40_1$–$40_N$ are the same for various color targets being simulated, the measured output color values $CV_4$ may vary significantly.

For example, two different types of printing in the graphic arts may be configured to print drastically different results for the input color values $CV_1$. One printing press may print with a dot gain of 10%, whereas another printing press may print with a dot gain of 40%. Thus, the quarter-tone gray of the first printing press may resemble the highlight gray of the second printing press. The term "gray," as used herein, refers to those colors formed by combinations of three or more colorants. Similarly, the saturated red of the first printing press may be well-balanced between yellow and magenta, whereas the second printing press may print a saturated red that is significantly skewed toward magenta due to poor overprinting efficiency.

Thus, the recalibration apparatus 12 and method of the present invention sample similar regions of color space, in terms of the selected input color values $CV_1$, and use them to recalibrate color imaging system 10, despite potentially drastic differences in the outputs of the various target imaging systems being simulated. The printed output of the selected input color values $CV_1$ always is modified by the color transformation LUT 20 of color imaging system 10. The recalibration apparatus 12 and method of the present invention calculate the deviation between the measured color values $CV_4$ for the particular color imaging system 10 and reference color values $CV_5$ for a calibrated condition in which an acceptable visual match to the target color response was initially achieved. In this manner, the one-dimensional LUT's of color correction LUT 22 can be adjusted, based on the deviation, to compensate for the variation of color imaging system 10 from the original color response function of a calibrated system using the same multi-dimensional color transformation function via LUT 20.

Figure 2:
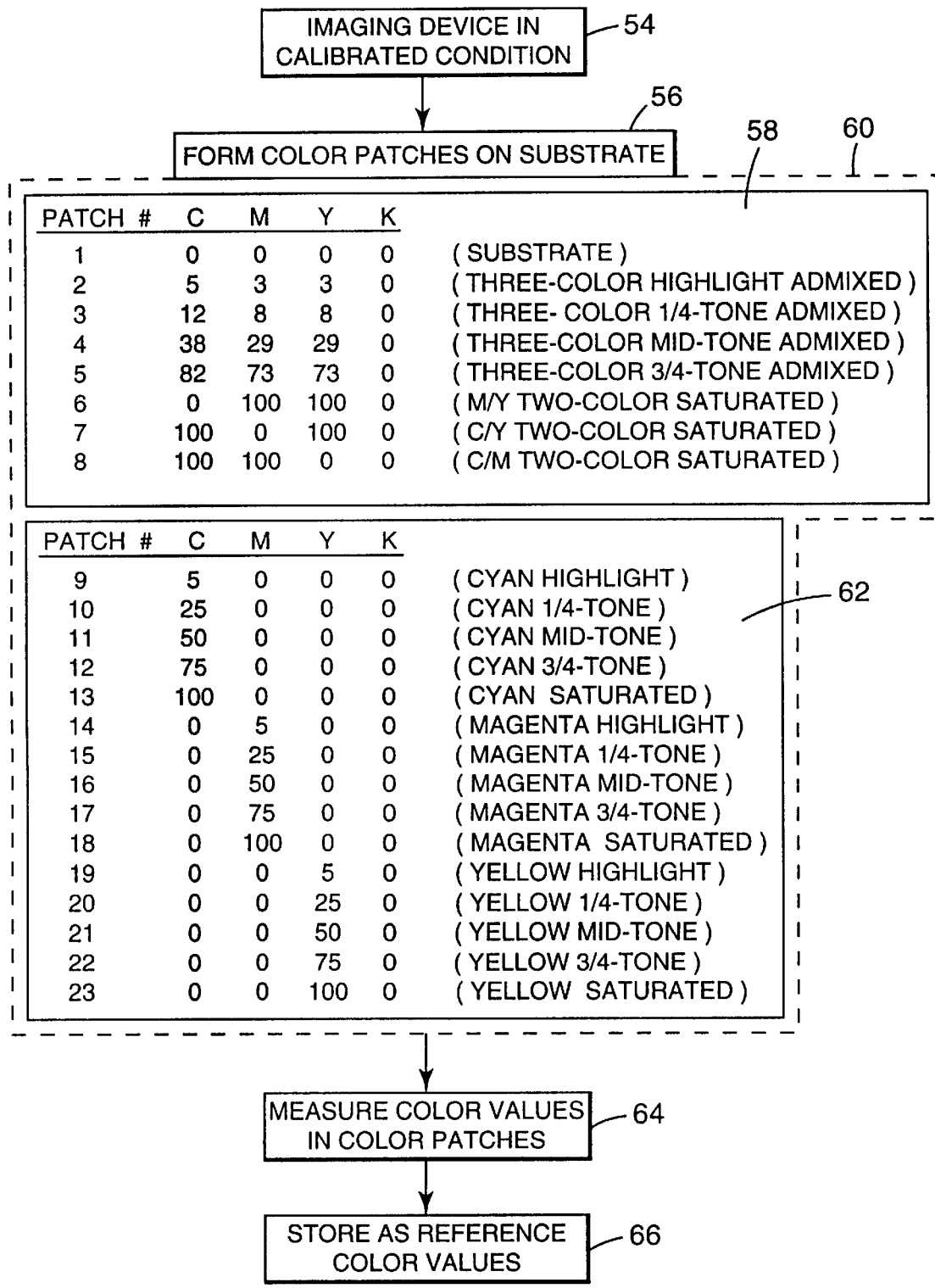
FIG. 2 is a flow diagram illustrating a reference setting mode of an apparatus and method for recalibrating a multi-color imaging system, in accordance with the present invention.

FIG. 2 is a flow diagram illustrating a reference setting mode of the recalibration apparatus 12 and method of the present invention. In the reference setting mode, processor 14 obtains reference color values $CV_5$ for storage in reference color value memory 46, shown in FIG. 1. The reference color values $CV_5$ represent the color values $CV_4$ measured from a plurality of different color patches for a calibrated condition of imaging system 10. The color patches used to obtain the reference color values $CV_5$ encompass the color patches that will be sampled in the recalibration mode. The recalibration mode may employ, however, less than all of the color patches used in the reference setting mode, depending on the color correction precision required by the system user.

As indicated by block 54 of FIG. 2, the reference setting procedure starts in a calibrated condition of imaging system 10. The imaging system 10 can be initially adjusted to the calibrated condition by conventional calibration techniques, numerical and/or visual. The initial calibration procedure may have been performed on a reference system in a laboratory or may have been performed on site at a customer location after performing a customized calibration to a particular target imaging system. The calibration technology used may have been color transformation via the use of a multi-dimensional LUT or similar transformation, or color transformation followed by one-dimensional LUT adjustment.

After imaging system 10 has been adjusted to the calibrated condition, color patches are formed for the reference setting procedure, as indicated by block 56. The color patches are formed based on a subset of input color values $CV_1$ selected by processor 14. The processor 14 selects the subset of input color values $CV_1$ such that one or more of the different color patches $40_1$–$40_N$ is formed by application of a combination of at least two of the different colorants to substrate 34. Preferably, the subset is selected such that one or more of the different color patches also is formed by application of a combination of at least three of the different colorants to substrate 34. The formation of at least some of color patches $40_1$–$40_N$ by application of a combination of two and, in some cases, three different colorants enables analysis of the effect of one-dimensional color correction on the color response for secondary and tertiary colors created by admixture of the colorants. The color space coordinates sampled by color patches $40_1$–$40_N$ essentially correspond to saturated secondary colors (saturated reds, greens, and blues) and highlight, quarter-tone, and midtone balanced tertiary colors (three-color balanced grays).

Careful selection of the subset of input color values $CV_1$ enables the reference setting and recalibration procedures to be performed with formation and measurement of a reduced number of color patches $40_1$–$40_N$. The color patches $40_1$–$40_N$ formed on substrate 34 in the recalibration mode may consist, for example, of less than seven different color patches, less than eight different color patches, less than nineteen different color patches, or less than twenty-three different color patches, as determined by the degree of color correction precision required by the user. The color patches formed in the reference setting mode should include, however, all of the color patches that possibly could be selected in the recalibration mode so that all reference color values $CV_5$ can be obtained for such patches, if needed. If desired, the reference setting and recalibration modes may include additional color patches to provide a broader sampling of color space for enhanced precision. Of course, additional color patches will require more measurements, decreasing the speed of the reference setting and recalibration procedure.

FIG. 2 illustrates two alternative subsets of input color values $CV_1$ for formation of color patches $40_1$–$40_N$ with CMYK colorants in the reference setting and recalibration procedures. A first subset, indicated by block 58, includes input color values $CV_1$ selected to form only seven color patches, numbered 2–8. In subset 58, patch no. 1 merely corresponds to the color of an unimaged area of substrate 34, such that C=M=Y=K=0. Thus, patch no. 1 need not be physically formed on substrate 34. Rather, the nonimaged area of substrate 34 corresponding to patch no. 1 can be measured. Measurement of the unimaged area of substrate 34 ensures accurate normalization of the color values $CV_4$ measured for the color patches relative to the substrate. Further, for each of color patch nos. 1–8, K=0. Consequently, the black colorant need not be applied to substrate 34 for any of the color patches.

The first subset 58 of input color values $CV_1$ are selected, using CMYK colorants, for example, such that:
  (i) patch no. 2 is formed by application of a combination of cyan, magenta, and yellow colorants in highlight-tone amounts, on the order of, for example, C=5, M=3, Y=3, on a 0–100% intensity scale;
  (ii) patch no. 3 is formed by application of a combination of cyan, magenta, and yellow colorants in quarter-tone amounts, on the order of, for example, C=12, M=8, Y=8, on a 0–100% intensity scale;

(iii) patch no. 4 is formed by application of a combination of cyan, magenta, and yellow colorants in mid-tone amounts, on the order of, for example, C=38, M=29, Y=29, on a 0–100% intensity scale;

(iv) patch no. 5 is formed by application of a combination of cyan, magenta, and yellow colorants in three-quarter tone amounts, on the order of, for example, C=82, M=73, Y=73, on a 0–100% intensity scale;

(v) patch no. 6 is formed by application of a combination of magenta and yellow colorants in saturated-tone amounts;

(vi) patch no. 7 is formed by application of a combination of cyan and yellow colorants in saturated-tone amounts; and (vii) patch no. 8 is formed by application of a combination of cyan and magenta colorants in saturated-tone amounts.

For a three color CMY system, the above patches are the minimum required for recalibration, in accordance with the present invention. If there also exists a black separation, measurement of the values C =M=Y=0, K=5, 25, 50, 75, 100 also may be desirable.

A second, alternative subset, indicated by block 60 of FIG. 2, includes both first subset 58 and an additional subset of input color values indicated by block 62, which contains fifteen patches, numbered 9–23. In the reference setting mode, the color patches should be formed on the basis of this larger subset 60 to obtain reference color values $CV_5$ for all color patches that possibly could be used in the recalibration mode. The second subset 60 of input color values $CV_1$ includes a greater number of color patches, and thus a greater number of samples throughout color space. Accordingly, recalibration with second subset 60 will produce enhanced precision. Nevertheless, second subset 60 still requires the formation and measurement of less than twenty-three different color patches. The second subset 60 of input color values CV1, using CMYK colorants, for example, is selected to include the color patches of subset 58 and further selected such that:

(viii) color patches nos. 9, 10, 11, 12, and 13 are formed by application of the cyan colorant in highlight-tone (e.g., C=5), quarter-tone (e.g., C=25), midtone (e.g., C=50), three-quarter tone (e.g., C=75), and saturated-tone (e.g., C=100) amounts, respectively;

(ix) color patches nos. 14, 15, 16, 17, and 18 are formed by application of the magenta colorant in highlight-tone (e.g., M=5), quarter-tone (e.g., M=25), midtone (e.g., M=50), three-quarter tone (e.g., M=75), and saturated-tone (e.g., M=100) amounts, respectively; and (x) color patches nos. 19, 20, 21, 22, and 23 are formed by application of the yellow colorant in highlight-tone (e.g., Y=5), quarter-tone (e.g., Y=25), midtone (e.g., Y=50), three-quarter tone (e.g., Y=75), and saturated-tone (e.g., Y=100) amounts, respectively.

The first subset 58 requires the formation of less than eight different color patches for the recalibration procedure. In the recalibration procedure, the three-quarter tone balanced gray patches are deemed less critical as a measure of color response. Therefore, patch no. 5, formed by application of a combination of cyan, magenta, and yellow colorants in three-quarter tone amounts, could be eliminated, further reducing the number of color patches necessary for recalibration with subset 58 to less than seven. Although a small amount of precision may be sacrificed by elimination of patch no. 5, further reduction of the number of color patches may be worthwhile in the interest of enhanced efficiency.

In subset 60, comprising both subset 58 and 62, less than twenty-three different color patches need to be formed for the recalibration procedure. As with first subset 58, the three-quarter tone balanced gray patches are deemed less critical as a measure of color response. Therefore, patch no. 5, formed by application of a combination of cyan, magenta, and yellow colorants in three-quarter tone amounts, and patch nos. 12, 17, and 22, formed by application of cyan, magenta, and yellow colorants, respectively, in three-quarter tone amounts could be eliminated, further reducing the number of patches necessary for recalibration with subset 60 to less than nineteen. Again, a small amount of precision may be sacrificed for enhanced efficiency due to elimination of patch nos. 5, 12, 17, and 22.

After the color patches have been formed in the reference setting mode, as indicated by block 56 of FIG. 2, measuring device 42 is activated to measure color values $CV_4$ from each color patch, as indicated by block 64. The measured color values $CV_4$ are provided to processor 14, either directly from measuring device 42 or from a system user via a user interface. The processor 14 then loads measured color values $CV_4$ into reference color value memory 46 as reference color values $CV_5$ for a calibrated condition of imaging system 10, as indicated by block 66. During the recalibration mode, processor 14 retrieves the stored reference color values $CV_5$ for comparison to newly measured color values $CV_4$ taken by measuring device 42.

Figure 3:
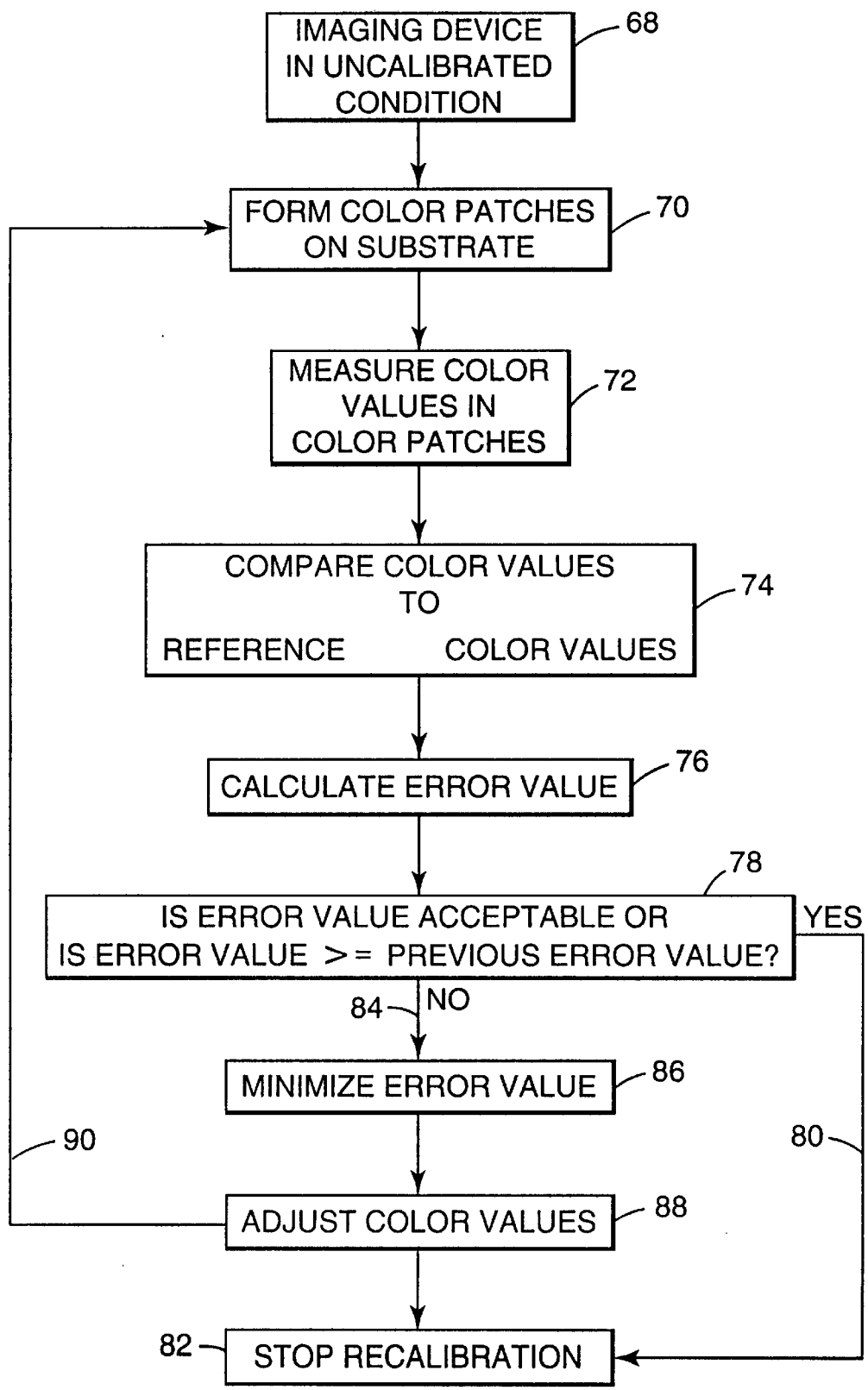
FIG. 3 is a flow diagram illustrating a recalibration mode of an apparatus and method for recalibrating a multi-color imaging system, in accordance with the present invention.

FIG. 3 is a flow diagram illustrating the recalibration mode of the recalibration apparatus 12 and method of the present invention. The processor 14 may initiate the recalibration mode in response to a user recalibration request, an elapsed period of time from the last recalibration or complete calibration, or a user request for simulation of a different target imaging system. In each case, it is assumed that imaging system 10 is in an uncalibrated condition, as indicated by block 68. From the uncalibrated condition, processor 14 controls printing mechanism 32 to form a plurality of different color patches on substrate 34, as indicated by block 70.

The color patches may correspond to all or some of the color patches formed during the reference setting mode, described above with reference to FIG. 2. Thus, the color patches $40_1$–$40_N$ formed in the recalibration mode are based on all or some of the same subset of input color values $CV_1$ selected by processor 14 for the reference setting mode. For example, color patches $40_1$–$40_N$ may be formed based on either first subset 58 or second subset 60 of input color values $CV_1$, as described with reference to FIG. 2. Alternatively, a lesser or greater number of color patches $40_1$–$40_N$ may be formed by contracting or expanding subsets 58, 60.

For simplicity, subset 58 and subset 60 could be designated, for selection by the system user, as providing a "quick" recalibration mode and a "comprehensive" recalibration mode, respectively. The comprehensive recalibration mode would provide a broader sampling of data points throughout color space. Therefore, the comprehensive recalibration mode would afford a higher likelihood of accuracy and rapid convergence because error minimization could be performed on a broader range of colors. For less stringent requirements, however, the quick recalibration mode may be used. If the error value achieved by the quick recalibration mode is within an acceptable range, there should be no need to continue recalibration. Thus, the quick recalibration mode can be used for either recalibration or for quality control, providing an indication of the error value for each proof. If the quick recalibration mode fails to yield an acceptable error value, however, the comprehensive recalibration mode can be initiated.

After the color patches have been formed, processor 14 activates measuring device 42 to obtain a plurality of measured color values $CV_4$ from each color patch, as indicated by block 72 of FIG. 3. The processor 14 then compares each of the measured color values $CV_4$ to a corresponding one of the reference color values $CV_5$ stored in reference color value memory 46, as indicated by block 74. Comparison of measured color values $CV_4$ to reference color values $CV_5$ serves as a comparison of the uncalibrated condition of imaging system 10 to its calibrated condition. As indicated by block 76, processor 14 next calculates an error value for measured color values $CV_4$. The error value represents the deviation of measured color values $CV_4$ from reference color values $CV_5$.

As indicated by block 78, processor 14 determines (i) whether the error value is equal to or less than a predetermined acceptable value, or (ii) whether the error value is equal to or less than an error value calculated in a preceding iteration. If either condition (i) or condition (ii) is true, the recalibration mode is stopped, as indicated by branch 80 and block 82. If condition (i) is true, the recalibration mode has driven imaging system 10 to within an acceptable error value range of the target color response. If condition (ii) is true, however, the most recent iteration of the recalibration mode has produced an error value that is greater than the error value produced in the previous iteration. Thus, either the error value has been reduced as low as possible, given the number of color space points used and the method of error minimization employed, or an error has occurred in the error minimization procedure. In either case, the recalibration mode is stopped and the system user is alerted.

If conditions (i) and (ii) are not true, the recalibration mode proceeds, as indicated by branch 84. The processor 14 proceeds to minimize the error value, as indicated by block 86, and adjusts one or more of input color values $CV_3$ in color correction LUT 22 based on the minimized error value, as indicated by block 88. The processor 14 adjusts the input color values $CV_3$ for each of the colorants independently of the adjustment of the input color values for the other colorants. Thus, the adjustment is one-dimensional, but relies on the error value calculated as a composite value for all color channels. As indicated by branch 90, the steps of the recalibration mode then are repeated, beginning with formation of color patches based on the newly adjusted input color values $CV_3$. The iterative process continues until either of the conditions of block 78 is satisfied, i.e., (i) the error value is equal to or less than a predetermined acceptable value, or (ii) the error value is equal to or less than an error value calculated in a preceding iteration.

The recalibration apparatus 12 and method of the present invention rely on a number of assumptions about imaging system 10. The assumptions enable determination of a minimal set of color space regions that must be optimized, and prediction of the effect of altering the linearity of the color channels on these color regions without physically measuring all of the permutations of color channel adjustments. The assumptions strike the balance between ease of use, i.e., small number of patches formed and measurements made, and accuracy, i.e., small deviation from the target color response as a result of recalibration. The assumptions (a)–(f) can be summarized as follows:

(a) The imaging system 10 employs significant color transformations in order to simulate the target imaging system. A "significant" color transformation may mean, for example, that simulation of a targeted primary color by imaging system 10 requires substantial contamination of the primary color with another primary color. The contamination may be, for example, on the order of twenty percent.

(b) The primary change in color response due to differences in substrate materials, colorant materials, or hardware is manifested by changes in tone response of the different colorants, such as cyan, magenta, yellow, and black. The changes in tone response for each colorant may be, for example, as high as ±fifteen percent in certain areas.

(c) Changes in color response due to changes in the mutual interaction between the color channels, e.g., CMYK, as they combine to form red, green, blue, gray, etc., are small relative to the changes in tone response discussed in assumption (b) above. A "small" change in the color response due to mutual interaction between the color channels may be, for example, on the order of about 3–6 delta E.

(d) Changes in color response due to changes in the spectral reflectance of the color channels is small relative to the change in tone response discussed in assumption (b) above. Again, a "small" change in color response due to changes in spectral reflectance may be, for example, on the order of about 3–6 delta E.

(e) Changes in the tone response of each colorant due to drift are smooth as a function of input gray value. Thus, a few sample points having widely spaced input gray values will give a good indicator of the shifts in the color response function of imaging system 10.

(f) The color transformation function employed has the property that for C=Y=M=0 and K>0 input, the dominant output color channel is K with no more than 20% admixture of CMY output. The dominance of K for the above relationship ensures that K can be recalibrated using standard linearization techniques instead of the mathematically more complex error minimization technique used by the recalibration apparatus 12 and method of the present invention, to be described.

The following mathematical expressions provide a foundation for discussion of the error minimization procedure carried out by the recalibration apparatus 12 and method of the present invention. It is assumed that some type of multidimensional color transformation is being performed within color imaging system 10 to simulate the color response of a target imaging system. In the following discussion, $F_2(x)$ represents the color response function of the target imaging system and $F_1(x)$ represents the color response function of imaging system 10. The general form for the color transformation function $T(x)$ that transforms $F_1(x)$ to $F_2(x)$ can be represented by the following expressions:

$$F_2(x) = F_1(T(x)) \tag{1}$$

where $$x = (c, m, y, k), \tag{2}$$

$$\mathbf{F}(x) = (L^*(x), a^*(x), b^*(x)), \text{ and} \tag{3}$$

$$\mathbf{T}(x) = (c'(x), m'(x), y'(x), k'(x)) \tag{4}$$

The use of bold type in the above expressions indicates a color space vector function or value. It is noted that the use of L*,a*,b* in the above expression is purely exemplary, and is not intended to restrict the use of other system-independent color space coordinate systems such as X,Y,Z. In the context of expression (1), it is assumed that imaging system 10 has been calibrated by the use of a multidimensional transformation to achieve an acceptable visual match with a target imaging system being simulated.

It is next assumed that a change or shift has occurred in the color response function of imaging system 10. The shift may have occurred due to changes in the material or hardware used to create the image, or even due to system-to-system variations for two systems of the same type. If the various assumptions described above are valid for imaging system 10, a one-dimensional correction to the input color values $CV_3$ for each of the independent color channels, in accordance with the present invention, should be adequate to achieve substantially the same quality as the original calibration represented in expression (1) above.

Let $F_1(x)$ again be the original color response function of imaging system 10 after a calibration with transform $T(x)$ has successfully been performed. In other words $F_1(x)$ is equivalent to $F_2(x)$ for a calibrated condition of imaging system 10. Let $F_1'(x)$ be the color response function of imaging system 10 due to a change or drift in materials or hardware. The change or drift can be corrected by producing an adjusted color response as follows:

$$F_1(x) \neq F_1'(x) \tag{5}$$

$$F_1(x) \approx F_1'(LUT(T(x),a)) \tag{6}$$

where LUT(x,a) is a one-dimensional LUT being applied to the independent color channels and is of the form:

$$LUT(x,a)=(c'(c,a_c), m'(m,a_m), y'(y,a_y), k'(k,a_k)) \tag{7}$$

and where the vector "a" defines a group of adjustment parameters that indicate adjustments to be made to input color values $CV_3$ in color correction LUT 22 at particular color space coordinates.

If the second-order errors, i.e., errors in colors formed by admixed colorants, produced by imaging system 10 were virtually zero, and if the means of measurement were perfectly accurate, then equations (5) and (6) would become perfect equalities rather than approximations. This would also imply that traditional linearization would be adequate to correct the color response function. Because the second order errors may be on the order of 3–6 delta E or more, however, equations (5) and (6) necessarily must remain approximations. Errors in the device used to measure color values $CV_4$ plus errors caused by systematic non-uniformity across the color patches being measured further unbalance equations (5) and (6). Thus, it is apparent that conventional one-dimensional linearization cannot adequately correct the color response function.

By careful selection of adjustment parameters a, in accordance with the present invention, however, the color response function can be corrected with a minimal number of color space measurements. The selection of parameters a is related to the selection of the critical color space regions to be measured for an accurate recalibration. With assumptions (a)–(f) above, color science plus color experience in the area of digital color proofing can be applied to select the critical color space parameters to be optimized.

Specifically, in the region from highlight to three-quarter tone, it is most critical to obtain the same gray balance as that obtained for the calibrated condition of imaging system 10. In other words, for best color response results, application of one-dimensional LUT correction to the relative values of the colorants, e.g., CMY, should result in L*a*b* values for three-color grays that are as similar as possible to the values measured in those areas for the calibrated condition of imaging system 10. Thus, the color space parameters defined by vector a should include tertiary color space regions from highlight to at least midtone, and preferably to three-quarter tone. The highlight to three-quarter tone region is considered most critical for accurate gray balance due to the high sensitivity of the human eye to shifts away from neutral gray.

In the region from three-quarter tone to maximum saturation, it is most critical to obtain the same color in the reds, greens, and blues as that obtained for the calibrated condition of imaging system 10. In other words, application of one-dimensional LUT correction to the relative values of the colorants, e.g., CMY, should result in L*a*b* values for reds, greens, and blues that are as similar as possible to the values measured in those areas for the calibrated condition of imaging system 10. Thus, the color space parameters defined by vector a also should include the above primary color regions. The three-quarter tone to saturated region is considered most critical for reds, greens, and blues because although slight errors in C=M=Y=100% are not very noticeable to the human eye due to the darkness of the color, imbalance of, for example, yellow and magenta in red is noticeable. For some applications using little gray color removal (GCR), the three-quarter tone gray also is important, particularly for dark brown colors.

The optimization of the color space parameters defined by vector a can be accompanied by a separate single-channel recalibration of black using the form of equation (6) with patches where K>0 and C=M=Y=0. If GCR is applied in the three-color grays as part of transformation $T(x)$, however, one should initially optimize CMYK based on the color response function of the independent channels, i.e., by beginning with standard linearization techniques. Once the black channel is within an acceptable range of calibration, optimization of admixed areas of color via adjustment of the a parameters should be performed as described below.

Consider a set of N patches of predetermined CMYK values. Let the function $F_1(T(x_i))$ represent the original L*a*b* values for color patch "i" of imaging system 10 in the calibrated condition. Likewise, let the function $F_1'(T(x_i))$ represent the L*a*b* values for color patch "i" of imaging system 10 in an uncalibrated condition. The a parameters can be found for the current system by minimizing the error function. First, the a parameters are separated into uncalibrated parameters $a_0$, which are constant, and the parametric changes $\Delta a$ necessary to drive imaging system 10 back to its calibrated condition. Thus, parameter a can be expressed as:

$$a = a_0 + \Delta a \tag{8}$$

The error function therefore can be expressed as:

$$Err(\Delta a) = \Sigma_i (F_1(T(x_i)) - F_1'(LUT(T(x_i), a_0 + \Delta a)))^2 \tag{9}$$

for i=1 to N. As long as the number of adjustment parameters is less than or equal to the number of color patches measured, there always will exist a unique set of parameters a for which the error function can be minimized. There are many standard methods for doing this minimization, such as minimization of the squares of the error and multiple linear regression. Note that such minimization methods are purely exemplary, and that any reasonable error function can be selected. Also note that $a_o$ may be adjustment values used in the original calibrated system, in which case $F_1(T(x))$ is actually $F_1(LUT(T(x), a_o))$, or $a_o$ may be values from a previous iteration of the recalibration procedure. An example of the former would be a situation in which the user creates a custom set of reference data via adjustment of a previously calibrated condition. The custom set of reference data may correspond to a particular proof generated by the user.

If $\Delta a_1$ represents the adjustment to the a parameters that results in a minimum value of the error function, the error function can be expressed as:

$$\text{Err}(\Delta a_1) = \text{Minimum}(\text{Err}(\Delta a)) \quad (10)$$

After determining the values of the parameters $a_1 = a_o + \Delta a_1$, a new set of color patches can be generated using input color values $CV_3$ adjusted with the color correction function $LUT(x, a_1)$. Thus, prior to generation of the new set of color patches, input color values $CV_3$ contained in color correction LUT 22 are adjusted according to the vector $a_1$. After measuring color patches corresponding to those previously measured, a new value for the error function $\text{Err}(\Delta a)$ can be computed by substituting $a_1$ for $a_0$ and setting all values of $\Delta a = 0$. If the value of the error function is deemed to be adequately small, recalibration is complete and successful. If the error value is reduced but not yet acceptable, the above procedure can be repeated. If the error value increases unexpectedly, however, the system user can be alerted and the recalibration procedure stopped. The recalibration procedure may often require a number of iterations due to the inaccuracies of the color model used to calculate the corrections required. The number of iterations is reduced as the model becomes a good predictor of how the system will respond to one-dimensional corrections in the color channels.

The recalibration apparatus and method of the present invention provide a number of advantages over the existing techniques such as either linearization or complete calibration. First, the recalibration technique of the present invention can be performed on a highly select group of critical patches. Linearization simply optimizes the color response functions of the color channels separately. The color channels generally represent non-critical colors, relative to grays, reds, greens, and blues, Second, the color values of the critical patches can be chosen without regard to the design of the control parameters a. As an illustration, the control points for correcting each color channel CMYK may be set at 5%, 25%, 50%, 75%, and 90%. The critical color patches may be defined, however, so as to give close to neutral gray balance for a calibrated system using input values of, for example, (5,3,3), (38,29,29), etc. in units of percent for (C,M,Y). The error minimization will ensure that optimal values for the control points "a" will result in optimal L*a*b* values at the designated patches. Typically, linearization requires measurements to be performed precisely at the locations of the control parameters. Third, the number of patches that must be measured can be orders of magnitude smaller than the number required by other existing calibration procedures for generating transforms, which often exceed one-thousand measurements. The reduced number of color patches is made possible by careful selection of the particular color patches to include only the most critical color space regions. Fourth, each time the recalibration procedure is performed, an error value is obtained prior to calculating $\Delta a$. The error value can be used as a very objective and numerical evaluation of how successfully the tool has recalibrated the system relative to the original calibration performed. Thus, the recalibration apparatus and method of the present invention not only optimizes the parameters defined by a, but also self-evaluates the color quality produced by such optimization.

Conventional linearization would tend to independently optimize the response of each dimension of color space. However, the critical color space regions, i.e., highlight to midtone three-color grays, saturated red, saturated green, and saturated blue, are very different for the color space of imaging system 10 and the targeted imaging system. The recalibration apparatus 12 and method of the present invention consider the critical color space regions by sampling not the native color space of imaging system 10, but rather the targeted color space, i.e., the color space of the target imaging system after color transformation. This approach tends to mimic the behavior of the targeted imaging system.

The error minimization procedure now will be described in greater detail. In the above mathematical expressions (5)–(10) for error minimization, the only portion containing variables to be optimized was the function $F_1'(LUT(T(x_i), a_0 + \Delta a)))$. This function indicates how the measured color value of L*a*b* for an uncalibrated system varies with changes in $\Delta a$. This function can be characterized and approximated in many different ways. One way is to create a mathematical model for the physical imaging process. However, this is generally difficult for non-halftone processes.

If the values of $a_0$ and $\Delta a$ are small relative to the possible range of values in the one-dimensional LUT, i.e., much smaller than 100%, the function $F_1'(LUT(T(x_i), a_0 + \Delta a)))$ can be rewritten as:

$$F_1'(LUT(T(x_i), a_0 + \Delta a))) = F_1'(LUT(T(x_i), a_0)) + \Delta F_1'(\Delta a) \quad (11)$$

where $$\Delta F_1'(\Delta a) \approx F_1(LUT(T(x_i), a_0 + \Delta a)) - F_1(LUT(T(x_i), a_0)) \quad (12)$$

Because this model is only an approximation, more than one iteration may be required. The original color response function $F_1(x)$, representing the color response function prior to any deviation, is used instead of $F_1'(x)$, the color response function after deviation occurs, to estimate how the output response will change with $\Delta a$. The original color response function $F_1(x)$ can be used because a significant amount of data exists for the calibrated condition, characterizing the color response function at a particular point in time. Alternatively, a new model for $F_1'(x)$ can be devised based on the recent data, but making use of the original data for $F_1(x)$. $F_1(x)$ can be in the form of an interpolated multi-dimensional lookup table (CMYK→L*a*b*), or in the form of multidimensional splines or polynomials. Note that while $F_1(x)$ is an interpolated function that estimates the dependence of L*a*b* on (C,M,Y,K), the expression $F_1(LUT(T(x_i), a_0))$ refers to the actual measured reference L*a*b* data associated with patch number "i" just as $F_1'(LUT(T(x_i), a_0))$ refers to the actual uncalibrated L*a*b* data associated with patch number "i".

A unique set of reference data can be stored for each color transform utilized in the system. Whether the color transform is provided by the supplier or generated on site by the user, a particular color calibration can be "locked in" by measuring the predetermined set of patches, averaging across sheet to minimize systematic errors, and storing the data in association with the particular color transform. Further, if the user wishes to make slight one-dimensional adjustments to an existing calibrated system, to make the gray balance slightly more red or green, for example, the user can do so according to personal preferences by generating the required measurement patches, and "locking in" on the slightly modified color calibration. For whatever values are stored during the reference setting procedure, the recalibration procedure will endeavor to drive the system back to its original calibrated condition via one-dimensional LUT correction.

Other ways of characterizing $F_1'(LUT(T(x_i),a_0+\Delta a)))$ by updating an old model with a new model can be easily devised. For example, an updated set of values can be estimated for the interpolated table mentioned above. Alternatively, the CMYK values could be processed to account for drift prior to indexing into the table. As a further alternative, a non-table based model could be used, subject to appropriate updating. The color function $F_1'(LUT(T(x_i), a_0+\Delta a)))$, configured generally as described herein, can be easily used to minimize the total error $Err(\Delta a)$. With more accurate characterizations of $F_1'(LUT(T(x_i),a_0+\Delta a)))$, however, fewer patches and fewer iterations could be required to achieve a certain level of color response quality.

The following non-limiting examples are provided to further illustrate the recalibration apparatus and method of the present invention.

EXAMPLE 1

A CMYK proof of an image was made using the 3M Rainbow™ digital proofing system as imaging system 10. The color imaging system targeted by the 3M Rainbow system was the 3M Matchprint™ III proofing system. The proof was generated by first selecting the MP3 color transform in the color management software provided with the 3M Rainbow™ digital proofing system. The MP3 color transform was in the form of a multi-dimensional color transformation LUT, such as LUT 20 in FIG. 1. The MP3 color transform implemented a color transformation function for simulation of the 3M Matchprint™ III proofing system. Application of the MP3 color transform to input color values $CV_1$ produced color-transformed input color values $CV_2$. Manual adjustments then were made to input color values $CV_2$ via a color correction LUT, such as LUT 22 in FIG. 1, to produce input color values $CV_3$ sufficient to produce an acceptable visual match between the output of the 3M Rainbow™ imaging system and the target 3M Matchprint™ III imaging system. The color correction LUT contained a set of one-dimensional color correction LUT's referred to collectively as $LUT(x,a)$ in mathematical expressions (6)–(13) above. The control points a for adjusting the color correction LUT to modify the color response of the independent CMYK channels were chosen to reside at intensity values of 5%, 25%, 50%, 75%, and 100% for each color channel. A value of 0% at any of the control points indicated no adjustment to the input gray level value.

A set of color patches was formed and measured. The set of color patches conformed to set 60 used in the comprehensive calibration mode described above with reference to FIGS. 2 and 3. The set 60 of color patches includes a first set conforming to set 58 and a second set conforming to set 62 also described with reference to FIGS. 2 and 3. The first set 58 of patches were seven in number (not including the unimaged substrate patch no. 1) and included patches formed on the 3M Rainbow™ system with the following CMYK values:

| Patch No. | C  | M  | Y  | K |
|-----------|----|----|----|---|
| 1         | 0  | 0  | 0  | 0 |
| 2         | 5  | 3  | 3  | 0 |
| 3         | 12 | 8  | 8  | 0 |
| 4         | 38 | 29 | 29 | 0 |
| 5         | 82 | 73 | 73 | 0 |

-continued

| Patch No. | C   | M   | Y   | K |
|-----------|-----|-----|-----|---|
| 6         | 0   | 100 | 100 | 0 |
| 7         | 100 | 0   | 100 | 0 |
| 8         | 100 | 100 | 0   | 0 |

The second set 62 of patches were fifteen in number and included patches formed on the 3M Rainbow™ system with the following CMYK values:

| Patch No. | C   | M   | Y   | K |
|-----------|-----|-----|-----|---|
| 9         | 5   | 0   | 0   | 0 |
| 10        | 25  | 0   | 0   | 0 |
| 11        | 50  | 0   | 0   | 0 |
| 12        | 75  | 0   | 0   | 0 |
| 13        | 100 | 0   | 0   | 0 |
| 14        | 0   | 5   | 0   | 0 |
| 15        | 0   | 25  | 0   | 0 |
| 16        | 0   | 50  | 0   | 0 |
| 17        | 0   | 75  | 0   | 0 |
| 18        | 0   | 100 | 0   | 0 |
| 19        | 0   | 0   | 5   | 0 |
| 20        | 0   | 0   | 25  | 0 |
| 21        | 0   | 0   | 50  | 0 |
| 22        | 0   | 0   | 75  | 0 |
| 23        | 0   | 0   | 100 | 0 |

Thus, the overall set 60 of color patches numbered twenty-two in total, discounting the unimaged substrate patch.

To begin the recalibration procedure, the reference setting procedure was first performed on the acceptable reference proof generated by the 3M Rainbow™ system. All twenty-two color patches were imaged in three vertical strips. Although each of the twenty-two patches was printed three times, only twenty-two different color patches were formed. The color patches in each of the three vertical strips were measured using a Gretag SPM 50 color measuring device using the metric $L^*a^*b^*$. The values for corresponding patches in the three vertical strips were averaged and saved in a reference color value memory in association with the particular color transformation that was used, which in this example was MP3. The averaging was performed across the width to account for cross-width variability in the characteristics of the substrate and/or printing mechanism.

For simplicity, the black color channel was not measured or recalibrated. Because the black color channel is not significantly affected by the color transformation process, as discussed in assumption (f) above, black can be recalibrated using standard linearization techniques. Thus, for a final product one would measure and recalibrate the black using standard linearization techniques. However, the purpose of this example is to show how to recalibrate CMY, in accordance with the present invention, having already recalibrated K, whether the critical color space regions contain under color removal (UCR) black or not. In this example, UCR was set to about 50%, resulting in comparable levels of K output relative to CMY in color space regions for color input values $C \approx M \approx Y$, $K=0$.

After obtaining the reference color values, a test of the recalibration apparatus and method of the present invention was performed. First, a new test image was generated using the same color transform used for the reference setting procedure, i.e., the MP3 color transform in the color management software provided with the 3M Rainbow™ system. However, a completely different set of color correction LUT input color values $a_o$ was used. The initial values $a_o$ were intentionally altered from the optimal values used during the reference setting procedure to simulate a severely uncalibrated system.

After measuring the average color values for each of the twenty-three color patches, including the unimaged patch, the RMS error value was obtained by calculating the standard deviation of the difference between the measured color values for the recently measured patches and the reference color values for the color patches measured in the reference setting procedure. The resulting error value can be referred to as "Err." If the value of Err had been acceptably low, there would have been no need to continue recalibration, and the user could have been informed that the system is in acceptable calibration. Because the value of Err was too high, and was less than the value of a previously calculated Err, the system calculated new values for a by error minimization, as represented by:

$$a_1 = a_o + \Delta a \quad (12)$$

Powell's method was used to perform the error minimization in this example. An example of Powell's method is discussed in Numerical Recipes in C, W. Press, pages 309–315. The new values $a_1$ were used to adjust the one-dimensional LUT's of color correction LUT 22, referred to above as LUT(x,a). This procedure was iterated three times until the value of the error value Err ceased to be reduced, and was approximately 1 delta E in value. A summary of the average delta E error for all twenty-three color patches relative to the reference proof is shown below:

|  | Average ΔE |
| --- | --- |
| Uncalibrated Proof | 3.49 |
| Recalibrated Proof (Three Iterations) | 0.69 |

The values of the "a" parameters also are shown below:

Original Values in Reference Proof:

|  | Level | | | | |
| --- | --- | --- | --- | --- | --- |
|  | 16 | 64 | 128 | 196 | 255 |
| Cyan | 3 | 9 | 6 | 2 | 0 |
| Magenta | 2 | -4 | -1 | 0 | 0 |
| Yellow | -1 | -1 | 0 | 2 | 0 |
| Black | -1 | 0 | 0 | 0 | 0 |

Original Values in Uncalibrated Proof:

| Original Values in Uncalibrated Proof: | | | | | |
| --- | --- | --- | --- | --- | --- |
|  | Level | | | | |
|  | 16 | 64 | 128 | 196 | 255 |
| Cyan | -5 | 1 | -2 | -6 | -8 |
| Magenta | -6 | -12 | -9 | -8 | -8 |
| Yellow | -1 | -1 | 0 | 2 | 0 |
| Black | -1 | 0 | 0 | 0 | 0 |
| Values After Three Iterations of the Recalibration Procedure: | | | | | |
| Cyan | 3 | 10 | 7 | 4 | 0 |
| Magenta | 2 | -5 | -1 | 0 | 0 |
| Yellow | -1 | -1 | 0 | 2 | 0 |
| Black | -1 | 0 | 0 | 0 | 0 |

A proof was printed with adjusted a parameters produced by three iterations of the comprehensive recalibration mode, and judged to be acceptable. As indicated above, the final adjusted a parameters closely resembled those of the original calibrated proof.

EXAMPLE 2

A recalibration procedure substantially similar to that described with respect to EXAMPLE 1 above was performed using the quick recalibration procedure described with reference to FIGS. 2 and 3. The quick recalibration procedure required the formation of only seven color patches, and the measurement of only eight, including the unimaged substrate patch. The results of the quick recalibration mode were similar to those of the comprehensive calibration mode, but slightly less accurate. The results are set forth below:

|  | Average ΔE |
| --- | --- |
| Uncalibrated Proof | 2.37 |
| Recalibrated Proof (Three Iterations) | 0.92 |

As the color model $F_1'(x)$ is improved, the above results will improve. Also, a convergence parameter can be employed to implement only a partial correction, thereby reducing the effects of noise plus error in $F_1'(x)$.

EXAMPLE 3

A recalibration procedure substantially similar to that described with respect to EXAMPLES 1 and 2 above was performed using the comprehensive recalibration procedure described with reference to FIGS. 2 and 3. In this EXAMPLE, a first 3M Rainbow™ color proofer ("proofer 1") was recalibrated using a reference data target created on a different 3M Rainbow™ proofer ("proofer 2"). Proofer 1 was at the low end of color response tolerance for a 3M Rainbow™ proofer. In this EXAMPLE, the black color channel was recalibrated in parallel with the CMY channels. The black was essentially recalibrated to an acceptable level after one iteration and the CMY channels were found to show no further improvement in recalibration after three iterations.

Figure 4:
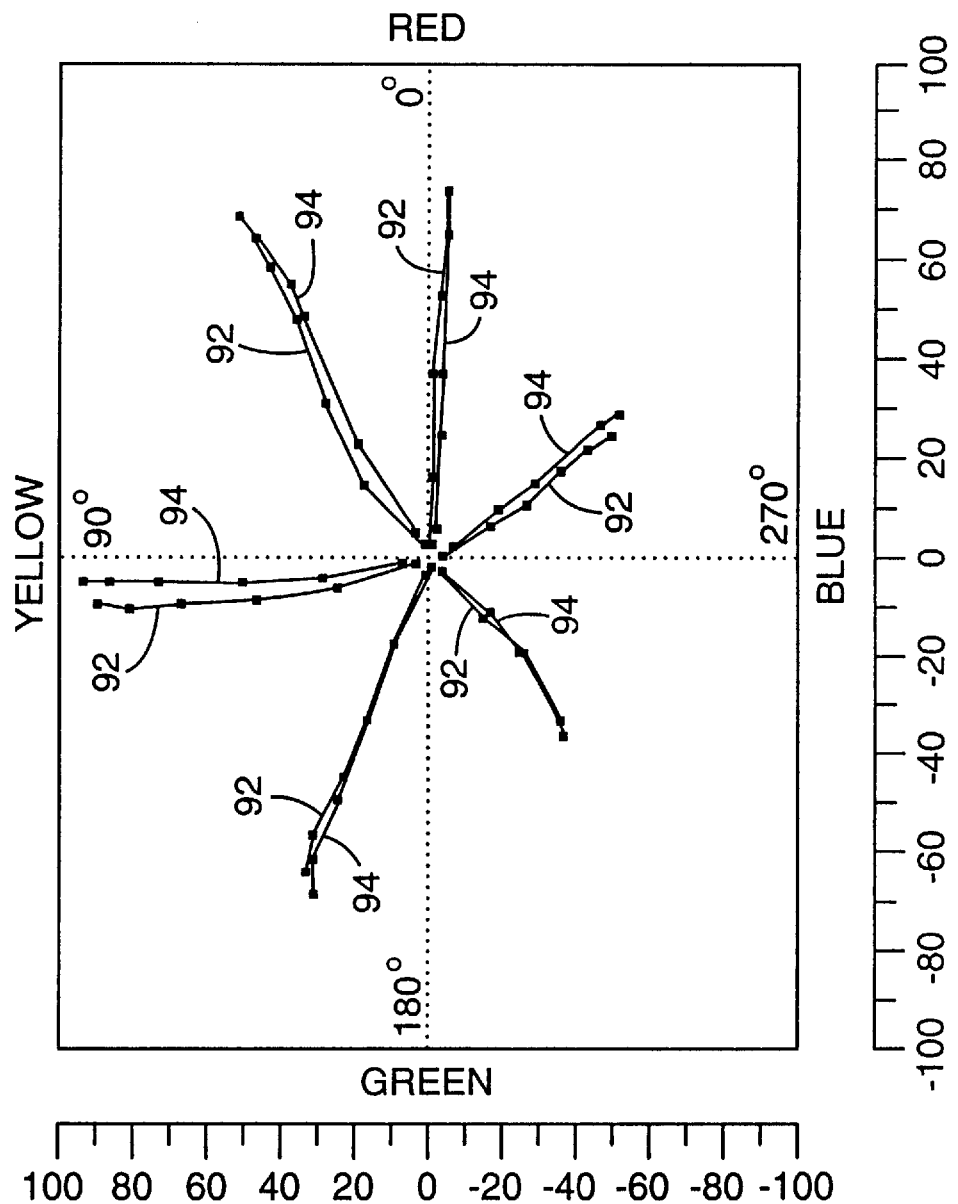
FIG. 4 is a color space plot illustrating relative color responses of an exemplary multi-color imaging system and an exemplary target multi-color imaging system.

FIG. 4 is a color space plot illustrating relative color responses of proofer 1 and proofer 2, as represented by red, green, blue, and yellow coordinates, prior to application of the recalibration procedure. In FIG. 4, the uncalibrated color response of proofer 1 is indicated by plot 92, and the target color response of proofer 2 is indicated by plot 94. FIG. 4 shows significant calorimetric differences between the color response of proofer 1 and the color response of proofer 2.

Figure 5:
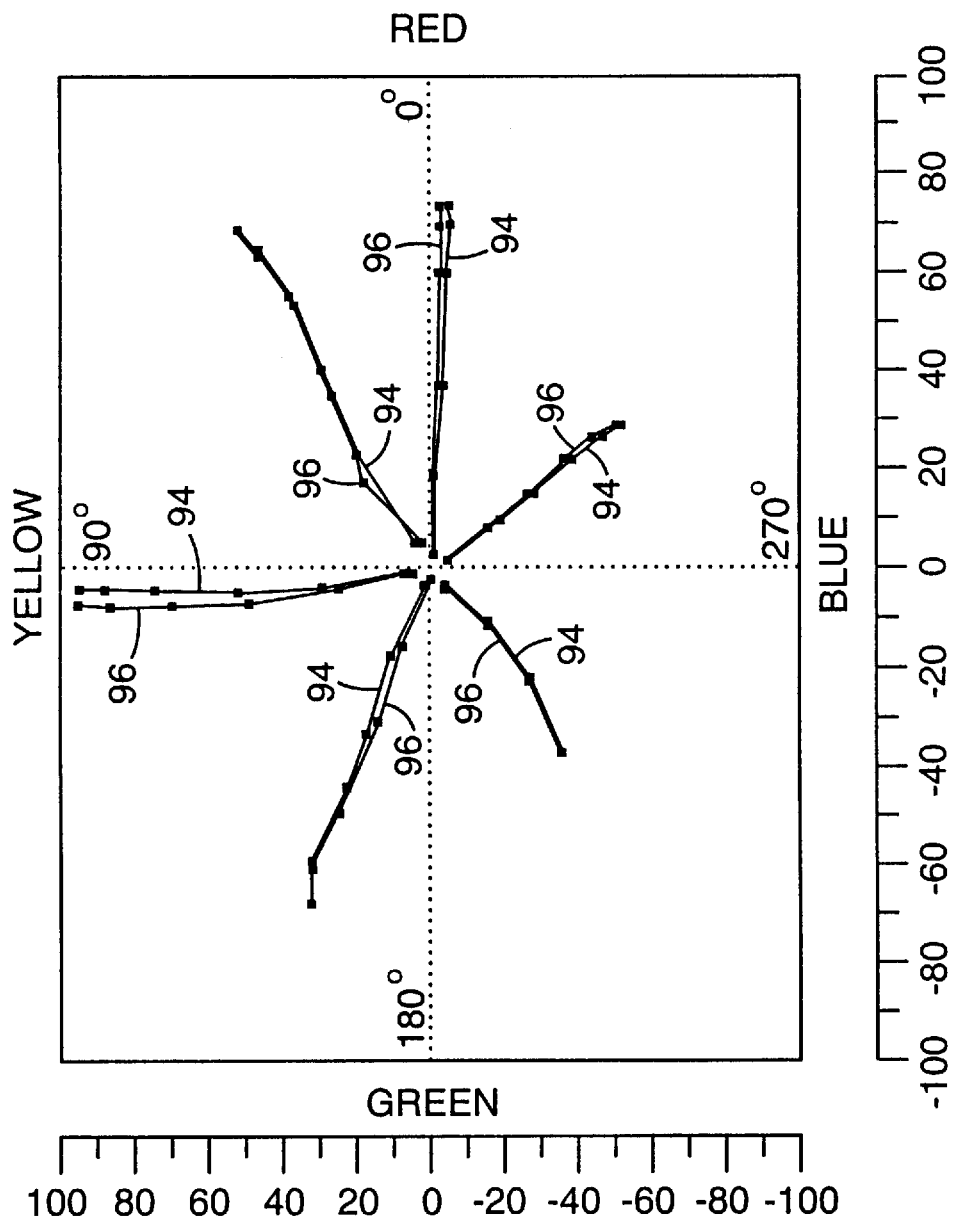
FIG. 5 is a color space coordinate plot illustrating relative color responses of the multi-color imaging system and target multi-color imaging system represented by FIG. 4 upon application of a recalibration method, in accordance with the present invention.

FIG. 5 is a color space coordinate plot illustrating relative color responses of proofer 1 and proofer 2 upon application of the comprehensive recalibration method described with reference to FIGS. 2 and 3. The recalibrated color response of proofer 1 is indicated by plot 96, and the target color response of proofer 2 again is indicated by plot 94. FIG. 5 shows the effectiveness of the recalibration procedure of the present invention in driving the color response of uncalibrated proofer 1 toward the target color response of proofer 2 in only three iterations.

Having described the exemplary embodiments of the invention, additional advantages and modifications will readily occur to those skilled in the art from consideration of the specification and practice of the invention disclosed herein. Therefore, the specification and examples should be considered exemplary only, with the true scope and spirit of the invention being indicated by the following claims.

What is claimed is:

1. An apparatus for recalibrating a multi-color imaging system, the imaging system being capable of applying different colorants to a substrate based on input color values, wherein each of the input color values controls an amount of one of the colorants to be applied to the substrate by the imaging system, the apparatus comprising:

(a) means for selecting a subset of the input color values;

(b) means for controlling the imaging system to apply one or more of the different colorants to the substrate based on the subset of the input color values, thereby forming different color patches on the substrate, wherein the subset of the input color values is selected by the selecting means such that one or more of the different color patches is formed by application of a combination of at least three of the different colorants to the substrate;

(c) means for measuring color values for each of the color patches formed on the substrate;

(d) means for comparing each of the measured color values to a corresponding one of a plurality of reference color values, the reference color values representing measured color values for a calibrated condition of the imaging system;

(e) means for calculating an error value representing a deviation of the measured color values from the reference color values; and (f) means for adjusting one or more of the input color values to reduce the error value to a predetermined degree, wherein the adjustment of the input color values for one of the colorants is performed independently of the adjustment of the input color values for others of the colorants.

2. The apparatus of claim 1, wherein the subset of the input color values is selected by the selecting means such that:

one of the different color patches is formed by application of a combination of at least three of the different colorants to the substrate in highlight-tone amounts;

one of the different color patches is formed by application of a combination of at least three of the different colorants to the substrate in quarter-tone amounts; and one of the different color patches is formed by application of a combination of at least three of the different colorants to the substrate in mid-tone amounts.

3. The apparatus of claim 2, wherein the subset of the input color values is selected by the selecting means such that one of the different color patches is formed by application of a combination of at least three of the different colorants to the substrate in three-quarter tone amounts.

4. The apparatus of claim 2, wherein the subset of the input color values is selected by the selecting means such that:

one of the different color patches is formed by application of a combination of a first and a second of the different colorants to the substrate in saturated-tone amounts, one of the different color patches is formed by application of a combination of the first and a third of the different colorants to the substrate in saturated-tone amounts, and one of the different color patches is formed by application of a combination of the second and the third of the different colorants to the substrate in saturated-tone amounts.

5. The apparatus of claim 4, wherein the subset of the input color values is selected by the selecting means such that:

each of a first subset of the different color patches is formed by application of a combination of a single one of the different colorants in a highlight-tone amount, each of a second subset of the different color patches is formed by application of a combination of a single one of the different colorants in a quarter-tone amount, and each of a third subset of the different color patches is formed by application of a combination of a single one of the different colorants in a mid-tone amount.

6. The apparatus of claim 5, wherein the subset of the input color values is selected by the selecting means such that each of a plurality of the different color patches is formed by application of a combination of a single one of the different colorants in a three-quarter tone amount.

7. An apparatus for recalibrating a multi-color imaging system, the imaging system applying different colorants to a substrate based on input color values, wherein each of the input color values controls an amount of one of the colorants to be applied to the substrate by the imaging system, the apparatus comprising:

(a) means for selecting a subset of the input color values;

(b) means for controlling the imaging system to apply one or more of the different colorants to the substrate based on the subset of the input color values, thereby forming different color patches on the substrate, wherein the subset of the input color values is selected by the selecting means such that:

one of the different color patches is formed by application of a combination of a first and a second of the different colorants to the substrate in saturated-tone amounts, one of the different color patches is formed by application of a combination of the first and a third of the different colorants to the substrate in saturated-tone amounts, and one of the different color patches is formed by application of a combination of the second and the third of the different colorants to the substrate in saturated-tone amounts;

(c) means for measuring color values for each of the color patches formed on the substrate;

(d) means for comparing each of the measured color values to a corresponding one of a plurality of reference color values, the reference color values representing measured color values for a calibrated condition of the imaging system;

(e) means for calculating an error value representing a deviation of the measured color values from the reference color values; and (f) means for adjusting one or more of the input color values to reduce the error value to a predetermined degree, wherein the adjustment of the input color values for one of the colorants is performed independently of the adjustment of the input color values for others of the colorants.

8. An apparatus for recalibrating a multi-color imaging system, the imaging system being capable of applying different colorants to a substrate based on input color values, wherein each of the input color values controls an amount of one of the colorants to be applied to the substrate by the imaging system, the apparatus comprising:

(a) means for selecting a subset of the input color values;

(b) means for controlling the imaging system to apply one or more of the different colorants to the substrate based on the subset of the input color values, thereby forming different color patches on the substrate, wherein the subset of the input color values is selected by the selecting means such that one or more of the different color patches is formed by application of a combination of at least two of the different colorants to the substrate;

(c) means for measuring color values for each of the color patches formed on the substrate in one of a plurality of system-independent color coordinate systems including L*a*b* and XYZ;

(d) means for comparing each of the measured color values to a corresponding one of a plurality of reference color values, the reference color values representing measured color values for a calibrated condition of the imaging system;

(e) means for calculating an error value representing a deviation of the measured color values from the reference color values; and (f) means for adjusting one or more of the input color values to reduce the error value to a predetermined degree, wherein the adjustment of the input color values for one of the colorants is performed independently of the adjustment of the input color values for others of the colorants.

9. An apparatus for recalibrating a multi-color imaging system, the imaging system being capable of applying different colorants to a substrate based on input color values, wherein each of the input color values controls an amount of one of the colorants to be applied to the substrate by the imaging system, the apparatus comprising:

(a) means for selecting a subset of the input color values;

(b) means for controlling the imaging system to apply one or more of the different colorants to the substrate based on the subset of the input color values, thereby forming different color patches on the substrate, wherein the subset of the input color values is selected by the selecting means such that one or more of the different color patches is formed by application of a combination of at least two of the different colorants to the substrate;

(c) means for measuring color values for each of the color patches formed on the substrate in one of a plurality of system-dependent color coordinate systems including RGB and density CMY, and converting the measured color values into one of a plurality of system-independent color coordinate systems including L*a*b* and XYZ;

(d) means for comparing each of the measured color values to a corresponding one of a plurality of reference color values, the reference color values representing measured color values for a calibrated condition of the imaging system;

(e) means for calculating an error value representing a deviation of the measured color values from the reference color values; and (f) means for adjusting one or more of the input color values to reduce the error value to a predetermined degree, wherein the adjustment of the input color values for one of the colorants is performed independently of the adjustment of the input color values for others of the colorants.

10. An apparatus for recalibrating a multi-color imaging system, the imaging system being capable of forming a plurality of different colorants on a substrate based on a plurality of input color values, wherein each of the plurality of input color values controls an amount of one of the colorants to be formed on the substrate by the imaging system, the apparatus comprising:

a measuring device for measuring a plurality of color values for each of a plurality of color patches formed on the substrate; and a processor configured to:

(a) select a subset of the plurality of input color values;

(b) control the imaging system to apply one or more of the different colorants to the substrate based on the subset of the plurality of input color values, thereby forming the plurality of different color patches on the substrate, wherein the subset of the plurality of input color values is selected such that one or more of the different color patches is formed by application of a combination of at least two of the different colorants to the substrate;

(c) compare each of the plurality of measured color values to a corresponding one of a plurality of reference color values, the reference color values representing measured color values for a calibrated condition of the imaging system;

(d) calculate an error value representing a deviation of the measured color values from the reference color values; and (e) adjust one or more of the plurality of input color values to reduce the error value to a predetermined degree, wherein the adjustment of the input color values for one of the colorants is performed independently of the adjustment of the input color values for others of the colorants.

11. The apparatus of claim 10, further comprising a lookup table memory containing a color correction lookup table having a plurality of dimensions, each of the dimensions mapping at least a collection of the input color values to a plurality of corrected input color values for one of the different colorants, wherein the processor is configured to use the corrected input color values to control the imaging system to apply the colorants to the substrate, and wherein the processor is further configured to adjust the plurality of corrected input color values of the correction lookup table to reduce the error value to the predetermined degree.

12. The apparatus of claim 10, wherein the processor is further configured to select the subset of the plurality of input color values such that the imaging system forms one or more of the different color patches by application of a combination of at least three of the different colorants to the substrate.

13. The apparatus of claim 10, wherein the plurality of different color patches consists of less than seven different color patches.

14. The apparatus of claim 10, wherein the processor is further configured to select the subset of the plurality of input color values such that the imaging system forms:

one of the different color patches by application of a combination of at least three of the different colorants to the substrate in highlight-tone amounts, one of the different color patches by application of a combination of at least three of the different colorants to the substrate in quarter-tone amounts, and one of the different color patches by application of a combination of at least three of the different colorants to the substrate in mid-tone amounts.

15. The apparatus of claim 14, wherein the processor is further configured to select the subset of the plurality of input color values such that the imaging system forms one of the different color patches by application of a combination of at least three of the different colorants to the substrate in three-quarter tone amounts.

16. The apparatus of claim 14, wherein the processor is further configured to select the subset of the plurality of input color values such that the imaging system forms:

one of the different color patches by application of a combination of a first and a second of the different colorants to the substrate in saturated-tone amounts, one of the different color patches by application of a combination of the first and a third of the different colorants to the substrate in saturated-tone amounts, and one of the different color patches by application of a combination of the second and the third of the different colorants to the substrate in saturated-tone amounts.

17. The apparatus of claim 16, wherein the processor is further configured to select the subset of the plurality of input color values such that the imaging system forms:

each of a plurality of the different color patches by application of a combination of a single one of the different colorants in a highlight-tone amount, each of a plurality of the different color patches by application of a combination of a single one of the different colorants in a quarter-tone amount, and each of a plurality of the different color patches by application of a combination of a single one of the different colorants in a mid-tone amount.

18. The apparatus of claim 17, wherein the processor is further configured to select the subset of the plurality of input color values such that the imaging system forms each of a plurality of the different color patches by application of a combination of a single one of the different colorants in a three-quarter tone amount.

19. A recalibration apparatus comprising:

a measuring device for measuring a plurality of color values for each of a plurality of color patches formed on a substrate; and a processor configured to:
(a) select a subset of a plurality of input color values, wherein each of the plurality of input color values controls an amount of one a plurality of different colorants to be formed on the substrate;
(b) control an imager to apply one or more of the different colorants to the substrate based on the subset of input color values, thereby forming the plurality of different color patches on the substrate, wherein the subset of input color values is selected such that one or more of the different color patches is formed by application of a combination of at least two of the different colorants to the substrate;
(c) compare each of the measured color values to a corresponding one of a plurality of reference color values, the reference color values representing measured color values for a calibrated condition of the imager;
(d) calculate an error value representing a deviation of the measured color values from the reference color values; and
(e) adjust one or more of the input color values to reduce the error value to a predetermined degree, wherein the adjustment of the input color values for one of the colorants is performed independently of the adjustment of the input color values for others of the colorants.

20. The apparatus of claim 19, further comprising a lookup table memory containing a color correction lookup table having a plurality of dimensions, each of the dimensions mapping at least a collection of the plurality of input color values to a plurality of corrected input color values for one of the different colorants, wherein the processor is configured to use the corrected input color values to control the imager to apply the colorants to the substrate, and wherein the processor is further configured to adjust the plurality of corrected input color values of the correction lookup table to reduce the error value to the predetermined degree.

21. The apparatus of claim 19, wherein the processor is further configured to select the subset of the plurality of input color values such that the imager forms one or more of the different color patches by application of a combination of at least three of the different colorants to the substrate.

22. The apparatus of claim 19, wherein the plurality of different color patches consists of less than seven different color patches.

23. The apparatus of claim 19, wherein the processor is further configured to select the subset of the plurality of input color values such that the imager forms:

one of the different color patches by application of a combination of at least three of the different colorants to the substrate in highlight-tone amounts, one of the different color patches by application of a combination of at least three of the different colorants to the substrate in quarter-tone amounts, and one of the different color patches by application of a combination of at least three of the different colorants to the substrate in mid-tone amounts.

24. The apparatus of claim 23, wherein the processor is further configured to select the subset of the plurality of input color values such that the imager forms one of the different color patches by application of a combination of at least three of the different colorants to the substrate in three-quarter tone amounts.

25. The apparatus of claim 23, wherein the processor is further configured to select the subset of the plurality of input color values such that the imager forms:

one of the different color patches by application of a combination of a first and a second of the different colorants to the substrate in saturated-tone amounts, one of the different color patches by application of a combination of the first and a third of the different colorants to the substrate in saturated-tone amounts, and one of the different color patches by application of a combination of the second and the third of the different colorants to the substrate in saturated-tone amounts.

26. The apparatus of claim 25, wherein the processor is further configured to select the subset of the plurality of input color values such that the imager forms:

each of a plurality of the different color patches by application of a combination of a single one of the different colorants in a highlight-tone amount, each of a plurality of the different color patches by application of a combination of a single one of the different colorants in a quarter-tone amount, and each of a plurality of the different color patches by application of a combination of a single one of the different colorants in a mid-tone amount.

27. The apparatus of claim 26, wherein the processor is further configured to select the subset of the plurality of input color values such that the imager forms each of a plurality of the different color patches by application of a combination of a single one of the different colorants in a three-quarter tone amount.

* * * * *